United States Patent
Shi et al.

(10) Patent No.: US 10,851,195 B2
(45) Date of Patent: Dec. 1, 2020

(54) POLYURETHANE (METH)ACRYLATE OLIGOMERS AND CURABLE COMPOSITIONS COMPRISING SAID OLIGOMERS

(71) Applicant: Arkema France, Colombes (FR)

(72) Inventors: Aibin Shi, Guangdong (CN); Liusheng Ouyang, Guangzhou (CN); Zheng Shi, Guangdong (CN); Qian T. Yang, Guangdong (CN); Mingxin Fan, Guangzhou (CN)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/748,952

(22) PCT Filed: Jul. 31, 2015

(86) PCT No.: PCT/CN2015/085686
§ 371 (c)(1),
(2) Date: Jan. 30, 2018

(87) PCT Pub. No.: WO2017/020159
PCT Pub. Date: Feb. 9, 2017

(65) Prior Publication Data
US 2019/0002618 A1    Jan. 3, 2019

(51) Int. Cl.
| | | |
|---|---|---|
| *C08F 290/14* | (2006.01) |
| *C08G 18/48* | (2006.01) |
| *C08G 18/67* | (2006.01) |
| *C08G 18/75* | (2006.01) |
| *C09D 175/16* | (2006.01) |
| *C08G 18/42* | (2006.01) |
| *C08G 18/73* | (2006.01) |

(52) U.S. Cl.
CPC ...... *C08F 290/147* (2013.01); *C08G 18/4269* (2013.01); *C08G 18/4833* (2013.01); *C08G 18/672* (2013.01); *C08G 18/6725* (2013.01); *C08G 18/73* (2013.01); *C08G 18/751* (2013.01); *C09D 175/16* (2013.01)

(58) Field of Classification Search
CPC ............. C08F 290/147; C08G 18/672; C08G 18/4269; C08G 18/73; C08G 18/751; C08G 18/4833; C08G 18/6725; C08G 18/40; C09D 175/16
See application file for complete search history.

(56) References Cited

U.S. PATENT DOCUMENTS

| | | | | |
|---|---|---|---|---|
| 4,504,635 | A * | 3/1985 | Weber, Jr. ............. | C08F 220/28 525/123 |
| 5,093,386 | A * | 3/1992 | Bishop ................ | C08F 290/147 522/103 |
| 6,254,937 | B1 | 7/2001 | Schafheutle et al. | |
| 6,258,441 | B1 * | 7/2001 | Oguchi ................. | C08F 259/08 428/141 |
| 6,414,079 | B1 | 7/2002 | Schafheutle et al. | |
| 8,114,920 | B2 | 2/2012 | Kim et al. | |
| 8,889,785 | B2 | 11/2014 | Niino et al. | |
| 2004/0259970 | A1 * | 12/2004 | Lockhart ............ | C08G 18/0823 522/84 |
| 2008/0319098 | A1 | 12/2008 | Hsieh et al. | |

FOREIGN PATENT DOCUMENTS

| | | |
|---|---|---|
| CN | 101280156 | 10/2008 |
| CN | 101747521 | 6/2010 |
| JP | 6243412 A | 2/1987 |
| JP | 2012126839 A | 7/2012 |
| JP | 201465790 A | 4/2014 |
| JP | 2014152324 A | 8/2014 |
| JP | 2014189651 A | 10/2014 |
| WO | WO2009/005835 | 1/2009 |

OTHER PUBLICATIONS

International Search Report PCT/CN2015/085686. dated Apr. 29, 2016.

* cited by examiner

*Primary Examiner* — Rabon A Sergent
(74) *Attorney, Agent, or Firm* — Christopher Lewis

(57) ABSTRACT

A polyurethane (meth)acrylate oligomer, having a tri-block symmetric structure BAB, comprises a polyether central block A linked by two urethane bonds to respectively two terminal hydrophobic blocs B based on hydrophobic polyester oligomers having a terminal (meth)acryloyloxy alkylene group. A curable composition (1k) comprises the oligomer and may be used for soft touch coatings in electronics, consumer goods and vehicle manufacture, as the resulting cured soft touch coating.

18 Claims, No Drawings

POLYURETHANE (METH)ACRYLATE OLIGOMERS AND CURABLE COMPOSITIONS COMPRISING SAID OLIGOMERS

BACKGROUND OF THE INVENTION

1. Field of the Invention

The present invention relates to polyurethane (meth)acrylate oligomers with B—A—B tri-block structure, a curable, particularly UV-curable soft touch polyurethane (meth)acrylate composition comprising said oligomers, a method of producing such polyurethane (meth)acrylate oligomers and their specific uses in UV curable soft touch coating applications.

2. Background Art

Products with soft touch coating are preferred by the consumers due to their soft and rubbery feeling. Electronics, consumer goods and vehicle manufacturers are the biggest consumers of soft touch coatings. Apart from its unique tactile feeling, the coating also should present other aspect of properties to function constantly when frequent interactions between users and the coating surface happen. The aforementioned properties include robust adhesion to the substrate, improved chemical resistance such as human sweat and lipsticks, excellent scratch resistance and non-yellowing, especially when used as a transparent coating.

Solvent borne polyurethanes using polyester or polyether polyols and isocyanates were utilized as the first generation of soft touch coating. However, increasing demand of more environmentally friendly coatings has pushed coating suppliers to provide new generation of waterborne 2K polyurethanes dispersions. Meanwhile, continuous effort is been made to develop one part (1K) soft touch coatings.

U.S. Pat. No. 6,254,937 described a waterborne crosslinkable polyurethane and polyureaurethane dispersion which comprised water dilutable polyols as soft segment and aromatic isocyanate as hard segment. Similar polyester urethane dispersion was disclosed in U.S. Pat. No. 6,414,079. Typically, these coating systems requires at least 20 mins curing due to its waterborne and thermo cure nature. It's not convenient for systems such as electronic devices that could not stand to elevated temperatures. Besides, the balance of soft touch feeling with other properties such as scratch resistance is hard to control.

U.S. Pat. No. 8,114,920 discloses a UV-curable aqueous emulsion coating composition using polyester polyol based urethane acrylate which can be used for coating various plastics. The curing cycle is greatly reduced, and the coating could be cured at room temperature. However, the evaporation of water limits the curing speed and energy saving.

1K soft touch coatings, including the UV curable coatings have been under development for a long period of time. U.S. Pat. No. 8,889,785 disclosed a solvent based 1K polyurethane coating based on polycarbonate polyols and isocyanates. Even though the chemical resistance is greatly improved, the utilization of organic solvents brings the environmental concerns.

Despite numerous efforts in developing new generation soft touch coatings, it is still a great challenge to provide a coating system which is fast curing, energy saving, balanced chemical resistance and scratch resistance, especially superior soft touch feeling. The main aim of the present invention is to provide a 1K UV curable polyurethane (meth)acrylates coating system with some or all the aforementioned features.

BRIEF DESCRIPTION OF THE INVENTION

The invention firstly relates to a polyurethane (meth)acrylate oligomer, which has a tri-block symmetric structure B—A—B, comprising a polyether central block A linked by two urethane bonds to respectively two terminal hydrophobic blocs B based on hydrophobic polyester oligomers obtained from polylactones (preferably polycaprolactone), having a terminal (meth)acryloyloxy alkylene group.

The second subject of the invention relates to a method of preparing said polyurethane oligomer in two steps.

Another subject of the invention relates to a curable composition comprising said polyurethane oligomer.

The invention covers also the uses of said polyurethane oligomer in soft touch applications.

Finally the invention covers the final cured coating as obtained from the cure of said polyurethane oligomer or of said curable composition.

DETAILED DESCRIPTION OF THE INVENTION

The first subject of the present invention is to provide a class of new polyurethane (meth)acrylate oligomers which are useful for soft touch coatings. These oligomers have a tri-block symmetric structure B—A—B, comprising a polyether central block A linked by chemical bonds of two diisocyanate molecules, to respectively two terminal hydrophobic blocs B based on hydrophobic polyester oligomers, having a terminal (meth)acryloyloxy alkylene group.

More particularly said polyurethane oligomer has the following general formula (I):

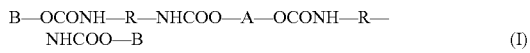

with

A: the residue of a polyether diol

OCONH—R—NHCOO: urethane link or bond of a diisocyanate R-(NCO)$_2$ with R being the residue of said diisocyanate, wherein R may have an aromatic, aliphatic or cycloaliphatic structure but preferably it has an aliphatic structure, in particular being a long aliphatic chain in at least C6 or R has a cycloaliphatic structure including in particular hydrogenated aromatic structure, B: the residue of a hydrophobic polyester oligomer, preferably polycaprolactone oligomer, bearing in terminal position a (meth)acryloyloxy alkylene group linked to the said polyester oligomer chain, preferably polycaprolactone oligomer chain, by an ester bond (—CO$_2$—).

According to a particular option said "alkylene" in said (meth)acryloyloxy alkylene terminal group is a C2 to C8, preferably C2 to C6 and more preferably a C2 to C4 alkylene, which may be linear or branched, preferably linear.

More particularly said hydrophobic polyester oligomer residue B, comprises in its structural repeating unit, at least 5 consecutive methylene groups, preferably at least 6 consecutive methylene groups and up to 12 methylene groups, more preferably 6 methylene consecutive groups.

According to a more preferred option said polyester oligomer in B, is a polycaprolactone oligomer bearing said terminal (meth)acryloyloxy alkylene group.

According to a particularly preferred case said block B corresponds to the following formula (II)

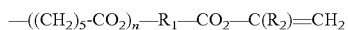

with $R_1$: being an alkylene in $C_2$ to $C_8$, preferably $C_2$ to $C_6$, more preferably $C_2$ to $C_4$ and $R_2$: being H or methyl, and n is from 3 to 15, preferably from 4 to 12 and more preferably from 4 to 10.

The polyether block A in said polyurethane oligomer is preferably polyoxyethylene, polyoxypropylene or statistic or block copolymer oligomers comprising ethoxy and propoxy units, more preferably polyoxyethylene or oligomers of polyethoxy-propoxy copolymers. The chain length of said polyether block A may correspond to a Mn (a number average molecular weight calculated from OH value) of from 150 to 3000, preferably from 200 to 2000 and more preferably from 200 to 1500, even more preferably from 300 to 1500 or alternatively it may correspond to an average number of repeating alkoxy units from 3 to 75, preferably from 3 to 50, more preferably from 3 to 30.

Concerning the chain length of said polyester in block B, it may correspond to an average number of ester repeating units going from 4 to 20, preferably from 4 to 15, even more preferably from 6 to 30.

In said diisocyanate $R(NCO)_2$, R residue may have an aromatic, aliphatic or cycloaliphatic structure but preferably it has an aliphatic structure, in particular being a long aliphatic chain in at least C6 or (preferably) R has a cycloaliphatic structure including in particular hydrogenated aromatic structure such as HMDI. As examples of suitable diisocyanate with R residue being aliphatic we may cite 1,6-hexamethylene diisocyanate (HMDI), isophorone diisocyante . . . . As exemples of suitable diisocyanate with a residue having aromatic structure we may cite 4,4'-methylene diphenyl diisocyanate (MDI), toluene diisocyanate (TDI) . . . .

As examples of suitable diisocyanate having a residue R with a cycloaliphatic structure we may cite isophorone diisocyanate, hydrogenated 4,4'-methylene diphenyl diisocyanate (hydrogenated MDI)

The second subject of the invention relates to a method of preparing said polyurethane oligomer as defined above according to the present invention and comprising the following successive steps:

i) preparation of a mono (meth)acrylated polyester monoalcohol B—OH, by a direct reaction of a lactone (preferably ε-Caprolactone) with a hydroxyalkyl (meth)acrylate followed by the ring opening polymerization of said lactone, leading to said polyester monoalcohol B—OH, ii) reaction of two moles of said B—OH monoalcohol (2 OH) with two moles of a diisocyanate OCN—R—NCO (4 NCO) and 1 mole of a polyether diol (2OH) leading to said polyurethane di(meth)acrylate oligomer, with R being the residue of said diisocyanate, preferably selected from aromatic, aliphatic or cycloaliphatic diisocyanates, including hydrogenated aromatic diisocyanates.

In one embodiment of the second subject of the invention, the B—OH monoalcohol and diisocyanate OCN—R—NCO are reacted prior to the addition of polyether diol.

In another embodiment of the second subject of the invention, steps i) and/or ii) is carried out in the presence of a catalyst and/or additive such as stabilizer. As an example of the catalyst, tin(II) 2-ethylhexaoate can be mentioned. As an example of the stabilizer, butylated hydroxyl toluene can be mentioned.

Another subject of the invention relates to a curable coating composition, which comprises at least one oligomer as defined above according to the present invention.

Preferably said curable composition is a radiation-curable composition, said radiation being selected from UV, electron beam, laser, LED, preferably said composition being UV-curable.

It may further comprise in addition to said oligomer, a curable (meth)acrylic monomer with a (meth)acrylate functionality of at least 1. The functionality of said monomeric (meth)acrylate will be chosen depending on the targeted reactivity and crosslink density of the cured coating. In fact said monomer is a reactive diluent which can adjust the viscosity of the curable composition.

More particularly said curable composition may further comprise a photoinitiator. This is in particular the case for a UV-curable composition.

Said curable composition may further comprise (in addition to said oligomer and photoinitiator) at least one additive preferably selected from: dispersing agent, colorant, matting agent, de-foaming agent and leveling agent.

Said curable coating composition, as a coating composition may be a varnish, an ink or a paint composition.

In particular said curable composition according to the invention is suitable for use in soft touch coatings in electronics such as smartphones and laptops, consumer goods including handles of gardening tools, and vehicle internal parts such as steering wheel.

Said curable coating composition of the present invention is a 1 K curable-composition. This means that it is storable without a risk of gelation at storage, without submitting to a radiation energy like UV or to electron beam.

Another subject of the present invention is the use of a polyurethane oligomer as defined above or as obtained by a process as defined according to the invention or by the use of a curable composition as defined above, in soft touch coating applications. More particularly said applications relate to soft touch coatings for electronics, consumer goods and vehicle manufacture.

Finally the invention covers a cured coating, which results from the cure, in particular from the UV-cure, of at least one polyurethane oligomer as defined above or as obtained by a process as defined according to the present invention or from the cure of a curable composition or by the use, both as defined above according to the present invention. More specifically said cured coating is a soft touch coating in particular for electronics including consumer electronics such as housings for computers, notebooks, smartphones, tablets, televisions, gaming equipment, computer equipment, computer accessories, MP3 players, consumer goods including handles of gardening tools, kitchen tools and other household products, and vehicle manufacture for the internal decoration and steering wheel.

Said cured coating may be applied to a substrate selected from metal such as steel or aluminum, plastic such as polyester such as polyethylene terephthalate, polyolefin such as polypropylene, polyamide in particular Nylon, cellulosic polymer, polystyrene, polyacrylic, rubber, polycarbonate, polyurethane, polymeric fiber-reinforced composite, wood, wood composite, particle board, cement, stone, glass, paper, cardboard, textile, synthetic or natural leather.

EXPERIMENTAL PART

The viscosity of different materials is measured using Brookfield RV viscometer, spindle 27 at 60° C., 20 RPM for 15 minutes. About 10 g of samples are weighted and placed in sample cup. Set the temperature to 60° C., speed at 20 RPM, spindle 27. Viscosity is recorded in cps after 15 minutes.

A) Preparation of B—OH Monoalcohol: Acrylated Polycaprolactone Monoalcohol Oligomer Caprolactone (2176 g), Hydroxyethylacrylate (HEA) (316 g), tin(II) 2-ethylhexaoate (0.5 g), butylated hydroxyl toluene (5 g) and Acrylic acid (2.5 g) were added to a 4-neck round bottom flask, and the temperature was raised to 130° C. over one and half hour under a nitrogen atmosphere. The mixture was stirred at 130° C. for 16-18 hours. The progress of the reaction was monitored by checking the amount of caprolactone residue in the mixture by GC (Gas Chromatography) The reaction was stopped when the viscosity reaches to around 90 cps at 60° C., and the percentage of caprolactone residue is less than 0.8%. A white wax product was obtained with a Mw around 1730 by GPC.

B) Preparation of Polyurethane Diacrylated Oligomers According to the Invention

EXAMPLE 1

Oligomer with A Block Based on PEG 600

Hydrogenated MDI (356 g), butylated hydroxyl toluene (4 g) and dibutyltin dilaurate (2 g) were added to a 4-neck round bottom flask and mixed well at room temperature. B—OH monoalcohol (1240.8 g) was added at a constant speed within 90 mins under dried air. The reaction is exothermal process; therefore, allow it exotherm to 60° C. at first 30 mins; then hold the temperature at 60° C. for the rest of the addition time. The mixture was kept at 60° C. for 20 mins after the addition of B—OH monoalcohol; then sampled for NCO %. PEG600 (397.2 g) was added dropwise after examining the NCO % was in the theoretical range (3.26%-3.86%), and the temperature started to increase to 85° C. at the same time. The mixture was kept at 85° C. for 2 hours, then sampled for NCO % hourly until NCO % was less than 0.06%. A transparent oil was obtained with a viscosity of around 2100 cps at 60° C. after cooled down and filtration.

EXAMPLE 2

Oligomer with A Block Based on PEG 300

Hydrogenated MDI (216.81 g), butylated hydroxyl toluene(2.2 g) and dibutyltin dilaurate (1.1 g) were added to a 4-neck round bottom flask and mixed well at room temperature. B—OH monoalcohol (755.92 g) was added at a constant speed within 90 mins under dried air. The reaction is exothermal process, therefore, allow it exotherm to 60° C. at first 30 mins; then hold the temperature at 60° C. for the rest of the addition time. The mixture was kept at 60° C. for 20 mins after the addition of B—OH monoalcohol; then sampled for NCO %. PEG300 (123.97 g) was added dropwise after checking the NCO% was in the theoretical range (3.26%-3.86%), and the temperature started to increase to 85° C. at the same time. The mixture was kept at 85° C. for 2 hours; then sampled for NCO% hourly until NCO% was less than 0.06%. After cooled down, the mixture was filtrated and a transparent oil was obtained with a viscosity around 2600 cps at 60° C. after cooled down and filtration.

EXAMPLE 3

Oligomer with A Block Based on PEG 200

Hydrogenated MDI (225.17 g), butylated hydroxyl toluene (2.2 g) and dibutyltin dilaurate (1.1 g) were added to a 4-neck round bottom flask and mixed well at room temperature. B—OH monoalcohol (784.96 g) was added at a constant speed within 90 mins under dried air. The reaction is exothermal process, therefore, allow it exotherm to 60° C. at first 30 mins, and then hold the temperature at 60° C. for the rest of the addition time. The mixture was kept at 60° C. for 20 mins after the addition of B-OH monoalcohol; then sampled for NCO%. PEG200 (86.68 g) was added dropwise after checking the NCO % was in the theoretical range (3.26%-3.86%), and the temperature started to increase to 85° C. at the same time. The mixture was kept at 85° C. for 2 hours, then sampled for NCO % hourly until NCO % was less than 0.06%. A transparent oil was obtained with a viscosity of around 2900 cps at 60° C. after cooled down and filtration.

The test formulations as shown in the table were prepared by mixing the polyurethane (meth)acrylate oligomer, the monomer, photo initiator, and the related additives, as well as the solvents. The resulted clear solutions were used for the final coating compositions.

Results

Pure oligomers, Examples 1, 2 and 3 were tested using EAC(Ethyl acetate), BAC(Butyl Acetate) and IPA(Isopropyl Alcohol) as the mixed solvent, 184 as photo initiator. Properties were tested and listed in the table.

Varnish was prepared by blending the oligomers (Example 1, Example 2, Example 3) with PI 184 and mixed solvent, then disperse the formula at 400 RPM for 5 minutes, filter the varnish. The varnish was sprayed to PC+ABS (polycarbonate+Acrylonitrile–Butadiene-styrene) panels with a cup-type gun at 1.5 to 4 bar spray pressure and 1 to 3 mm nozzle diameter with a film thickness of 30 μm to 40 μm. After 5 minutes solvent evaporation at 60° C., the coating thickness should be around 15 μm to 20 μm. The varnish was cured by passing through the Fusion UV dryer (H lamp), 365 μm peak wave at about 600-800 mJ /cm$^2$, 2000 mW/cm. Cure speed was controlled and measured. Soft touch feeling was examined subjectively by touching the coating surface with finger.

All three urethane oligomers, examples 1, 2 and 3, have soft touch feeling properties after UV cure. Example 1 and 2 are superior to example 3 in feeling, which could be caused by the chain length of polyalkoxy block A. Shorter chain length will lead to less flexibility of molecule thus reducing the soft feeling performance. However, the curing speed was increased with shorter block A.

Substances used and abbreviations:
PI 184: Photo initiator, provide the surface curing property (HuaTai Company)
PI TPO: Photo initiator, provide the deep curing property (HuaTai Company)
N3300: Aerosol, matting powder (Degussa Company)
Tego 432: Dispersion agent, improve the dispersion property of fillers (Degussa Company, Tego additives)
Mixed Solvent: EAC/ BAC/IPA (Ethyl acetate/Butyl Acetate/Isopropyl Alcohol)=65/20/15 (By weight), diluent the viscosity for better spay property.

TABLE 1

| Oligomer basic properties without any additives | | | |
|---|---|---|---|
| Oligomer used | Ex. 1 | Ex. 2 | Ex. 3 |
| Oligomer weight | 38 | 38 | 38 |
| 184 | 2 | 2 | 2 |
| EAC | 39 | 39 | 39 |
| BAC | 12 | 12 | 12 |
| IPA | 9 | 9 | 9 |
| Curing speed/(m/min) | 10 | 20 | 30 |
| Soft touch feeling | Excellent | Excellent | Very good |

Two comparative examples using the same formulation and procedure as aforementioned were also tested. CN9782 and CN965, two commercial available resins from Sartomer, were used as the oligomer respectively. These two oligomers are with flexible structure. All three inventive oligomers showed superior soft feeling to CN9782 and CN965.

TABLE 2

Inventive oligomers compared with CN9782 and CN965 without additives

|  | A Parts by wt. | B Parts by wt. | C Parts by wt. | D Parts by wt. | E Parts by wt. |
|---|---|---|---|---|---|
| Example 1: oligomer 1 | 40 | | | | |
| Example 2: oligomer 2 | | 40 | | | |
| Example 3: oligomer 3 | | | 40 | | |
| CN9782 | | | | 40 | |
| CN965 | | | | | 40 |
| PI 184: Photo initiator | 2 | 2 | 2 | 2 | 2 |
| Solvent: EAC/BAC/IPA = 65/20/15, | 58 | 58 | 58 | 58 | 58 |
| Total | 100 | 100 | 100 | 100 | 100 |
| Technical Coating Data | | | | | |
| Viscosity, 4# cup, 25° C., | 12 s | 12 s | 12 s | 12 s | 12 s |
| Cure speed | 10 m/min | 20 m/min | 30 m/min | 10 m/min | 20 m/min |
| Soft touch feeling | Excellent | Excellent | Very good | Fair | Fair |

Furthermore, a complete 1 k formulation was developed with additives such as dispersing agent Tego 432 and matting agent Aerosil N3300.

Varnish was prepared by mixing the oligomers (Example 1, Example 2, Example 3) with PI 184, dispersing agent Tego 432 and mixed solvent. The compositions were dispersed at 400 RPM for 5 minutes to dissolve the photo initiator PI 184 and the dispersing agent Tego 432, followed by filtration. Aerosil N3300 was added to the formula while dispersing at 400 RPM, room temperature for 10 minutes.

Spray the varnish to different kinds of panels with a cup-type gun at 1.5 to 4 bar spray pressure and 1 to 3 mm nozzle diameter with a film thickness of 30 μm to 40 μm.

After 5 mines evaporation at 60° C., the thickness of dry layer should be around 15 μm to 20 μm.

The coating panels were cured by passing through the UV lamp at about 800-1200 mJ/cm², 2000 mW/cm. Cure speed was controlled and measured. RCA abrasion resistance was measured following ASTM F2357 using Norman Tool RCA Abrader. Number of cycles was recorded when the paper tape destroyed the coating surface under 175 g force. Solvent MEK (methyl ethyl ketone) resistance was measured following RJSC solvent resistance test method. Number of cycles was measured when the coating surface was destroyed under 1 kg force.

Similar trend was observed in this formulation. Compared to CN9782 and CN965, all three inventive oligomers still showed excellent soft touch feelings even with additives. Oligomer example 3 showed superior curing speed, scratch and solvent resistance.

TABLE 3

Inventive oligomers compared with CN9782 and CN965 in formulation

|  | E Parts by wt. | F Parts by wt. | G Parts by wt. | H Parts by wt. | I Parts by wt. |
|---|---|---|---|---|---|
| Example 1: | 40 | | | | |
| Example 2: | | 40 | | | |
| Example 3: | | | 40 | | |
| CN9782 | | | | 40 | |
| CN965 | | | | | 40 |
| PI 184: Photo initiator | 3 | 3 | 3 | 3 | 3 |
| PI TPO: Photo initiator | 0.5 | 0.5 | 0.5 | 0.5 | 0.5 |
| Tego$^R$ 432: Dispersing agent | 0.5 | 0.5 | 0.5 | 0.5 | 0.5 |
| N3300: Matt powder | 4.8 | 4.8 | 4.8 | 4.8 | 4.8 |
| Solvent: EAC/BAC/IPA = 65/20/15, | 51.2 | 51.2 | 51.2 | 51.2 | 51.2 |
| Total | 100 | 100 | 100 | 100 | 100 |
| Technical Coating Data | | | | | |
| Viscosity, 4# cup, 25° C., Basic Properties | 12 s | 12 s | 12 s | 12 s | 12 s |
| Soft Feeling | Excellent | Excellent | Very good | Fair | Fair |
| Cure speed | 10 m/min | 45 m/min | 50 m/min | 10 m/min | 30 m/min |
| RCA Abrasion resistance | 12 cycle | 130 cycle | 120 cycle | 10 cycle | 14 cycle |
| MEK resistance | 17 cycle | 58 cycle | 115 cycle | 15 cycle | 43 cycle |

The invention claimed is:

1. A curable coating composition suitable for use in soft touch coatings, wherein the composition comprises at least one polyurethane (meth)acrylate oligomer, wherein the oligomer has a tri-block symmetric structure B—A—B, comprising a polyether central block A linked by urethane bonds of two diisocyanate molecules, to respectively two terminal hydrophobic blocks B, wherein polyether central block A is based on polyoxyethylene or oligomers of polyethoxy-propoxy copolymers and hydrophobic blocks B are based on hydrophobic polyester oligomers generated from a poly-caprolactone comprising 6 to 30 ester repeating units, having a terminal (meth)acryloyloxy alkylene group.

2. The composition according to claim 1, wherein the oligomer has the following general formula (I):

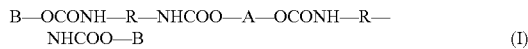

(I)

with
- A: the residue of a polyether diol OCONH—RNHCOO: urethane link or bond of a diisocyanate R—(NCO)$_2$ with R being the residue of said diisocyanate,
- B: the residue of a hydrophobic polyester oligomer, bearing in terminal position a (meth)acryloyloxy alkylene group linked to said polyester oligomer, by an ester bond (—CO$_2$—).

3. The composition according to claim 1, wherein said alkylene in said (meth)acryloyloxy alkylene terminal group is a C2 to C8 alkylene.

4. The composition according to claim 1, wherein said block B corresponds to the following formula (II) —((CH$_2$)$_5$-CO$_2$)$_n$—R$_1$—CO$_2$—C(R$_2$)=CH$_2$: with R$_1$: being C$_2$ to C$_8$ alkylene and R$_2$: being H or methyl, and n is from 6 to 30.

5. The composition according to claim 1, wherein the chain length of the polyether block A corresponds to an Mn a number average molecular weight calculated from OH value of from 150 to 3000, or alternatively it corresponds to an average number of repeating alkoxy units from 3 to 75.

6. Curable composition according to claim 1, wherein it is a radiation-curable composition, said radiation being selected from UV, electron beam, laser, LED.

7. Curable composition according to claim 1, further comprising in addition to said oligomer, a curable (meth)acrylic monomer with a (meth)acrylate functionality of at least 1.

8. A curable composition according to claim 1, further comprising a photoinitiator.

9. A curable composition according to claim 1, further comprising at least one additive selected from: dispersing agent, colorant, matting agent, de-foaming agent and leveling agent.

10. A curable composition according to claim 1, wherein the composition is a varnish, ink or a paint composition.

11. Curable composition according to claim 1, wherein the composition is suitable for use in soft touch coatings in electronics, consumer goods and vehicle internal parts.

12. Curable composition according to claim 1, wherein it is a 1 K curable-composition.

13. A method of preparing a soft touch coating comprising curing the curable composition of claim 1.

14. The method of claim 13, wherein said soft touch coatings are for electronics, consumer goods and vehicle manufacture.

15. Cured coating, wherein it results from the cure of the curable composition claim 1.

16. Cured coating according to claim 15, wherein it is a soft touch coating for electronics.

17. Cured coating according to claim 16, wherein the coating is applied to a substrate selected from metal, plastic, polyolefin, polyamide, cellulosic polymer, polystyrene, polyacrylic, rubber, polycarbonate, polyurethane, polymeric fiber-reinforced composite, wood, wood composite, particle board, cement, stone, glass, paper, cardboard, textile, synthetic or natural leather.

18. Cured coating according to claim 16, wherein the coating is a soft touch coating for electronics which are consumer electronics selected from:
   computers, notebooks, smartphones, tablets, televisions, gaming equipment, computer equipment, computer accessories, MP3 players, consumer goods including handles of gardening tools, kitchen tools and household products, and vehicle manufacture for the internal decoration and steering wheel.

* * * * *